United States Patent
Barber et al.

(10) Patent No.: US 8,264,961 B2
(45) Date of Patent: Sep. 11, 2012

(54) SYNCHRONIZATION AND MACRO DIVERSITY FOR MCBCS

(75) Inventors: Phillip Barber, McKinney, TX (US); Liang Gu, Shanghai (CN); Limei Wang, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 510 days.

(21) Appl. No.: 12/253,717

(22) Filed: Oct. 17, 2008

(65) Prior Publication Data

US 2009/0103467 A1    Apr. 23, 2009

Related U.S. Application Data

(60) Provisional application No. 60/981,096, filed on Oct. 18, 2007.

(51) Int. Cl.
| | |
|---|---|
| G01R 31/08 | (2006.01) |
| G06F 11/00 | (2006.01) |
| G06F 15/16 | (2006.01) |
| G06F 9/00 | (2006.01) |
| G06F 17/00 | (2006.01) |
| G08C 15/00 | (2006.01) |
| H04J 1/16 | (2006.01) |
| H04J 3/14 | (2006.01) |
| H04J 3/22 | (2006.01) |
| H04J 3/06 | (2006.01) |
| H04J 3/26 | (2006.01) |
| H04L 1/00 | (2006.01) |
| H04L 12/26 | (2006.01) |
| H04L 12/56 | (2006.01) |
| H04H 20/71 | (2008.01) |

(52) U.S. Cl. ........ 370/231; 370/235; 370/349; 370/350; 370/312; 370/390; 370/432; 370/392; 709/203; 709/249; 726/12; 726/14

(58) Field of Classification Search .............. 370/231, 370/235, 349, 350, 312, 390, 432, 392; 709/203, 709/249; 726/12, 14
See application file for complete search history.

(56) References Cited

U.S. PATENT DOCUMENTS

2004/0039839 A1    2/2004    Kalyanaraman et al.
(Continued)

FOREIGN PATENT DOCUMENTS

WO    WO 2008/017272 A1    2/2008

OTHER PUBLICATIONS

Li, K-H., "Wimax Network Architecture," Intel, Wimax Solutions Division, Jun. 5, 2006, 19 pages.
(Continued)

*Primary Examiner* — Alpus H Hsu
*Assistant Examiner* — Yee Lam
(74) *Attorney, Agent, or Firm* — Slater & Matsil, L.L.P.

(57) ABSTRACT

A method and system for multicast and broadcast system (MCBCS) synchronization and macro diversity is provided. In an embodiment, an MBS Proxy creates the necessary messages with synchronization rules embedded therein. The messages are provided to an MBS Distributed DPF and a base station, which performs a final PHY frame construction for transmission. In another embodiment, the MBS Proxy provides the necessary information to the base station and the base station creates the messages, including the synchronization rules. In yet another embodiment, the base station receives raw IP packet information and synchronization information. In this last embodiment, the base station creates the packets and frames based on the information provided to it.

20 Claims, 7 Drawing Sheets

U.S. PATENT DOCUMENTS

| | | | |
|---|---|---|---|
| 2006/0239264 A1* | 10/2006 | Kang et al. | 370/390 |
| 2006/0239265 A1* | 10/2006 | Son et al. | 370/390 |
| 2007/0230351 A1* | 10/2007 | Dang | 370/236 |
| 2007/0253367 A1* | 11/2007 | Dang et al. | 370/329 |
| 2008/0008176 A1* | 1/2008 | Lim et al. | 370/390 |
| 2008/0049941 A1 | 2/2008 | Kim et al. | |
| 2008/0056219 A1 | 3/2008 | Venkatachalam | |
| 2008/0101333 A1 | 5/2008 | Semper | |
| 2008/0175238 A1 | 7/2008 | Venkatachalam | |
| 2008/0212509 A1 | 9/2008 | Kim et al. | |
| 2008/0240097 A1 | 10/2008 | Kim et al. | |
| 2008/0259835 A1 | 10/2008 | Venkatachalam et al. | |
| 2009/0034459 A1* | 2/2009 | Shousterman et al. | 370/329 |
| 2009/0046637 A1* | 2/2009 | Kim et al. | 370/329 |
| 2009/0073995 A1* | 3/2009 | Pandey et al. | 370/401 |

OTHER PUBLICATIONS

"Part 16: Air Interface for Fixed and Mobile Broadband Wireless Access Systems, Amendment for Physical and Medium Access Control Layers for Combined Fixed and Mobile Operation in Licensed Bands," IEEE P802.16e, D12, Oct. 14, 2005, pp. 1-658, Institute of Electrical and Electronics Engineers, Inc., New York, NY.

"Annex A: IEEE 802.16 MCBCS Synchronization Support (informative)," Oct. 14, 2005, 4 pages.

"MBS Architecture and Framework Scope, Major Processes," Proposal for Rel. 1.5, Alvarion, May 2007, 16 pages, Wimax Forum.

Ergen, M., "The Access Service Network in WiMAX: The Role of ASN-GW," WiChorus, Inc., Oct. 29, 2007, 15 pages.

"MCBCS Synchronous Transmission Support over WiMAX Network," Part of Network Release 1.5, Draft, Jan. 2006, pp. 1-38.

* cited by examiner

MOBILE STATION

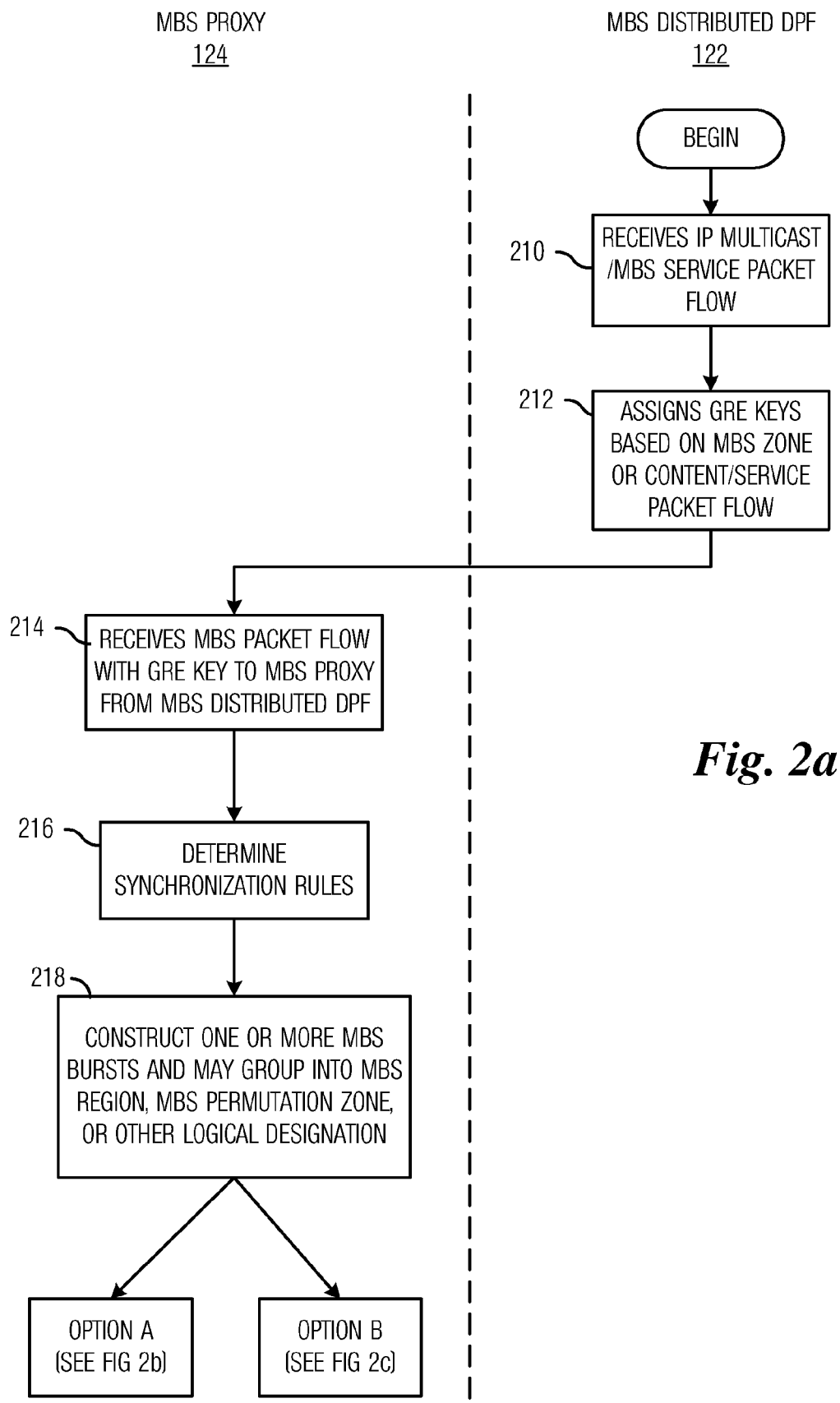

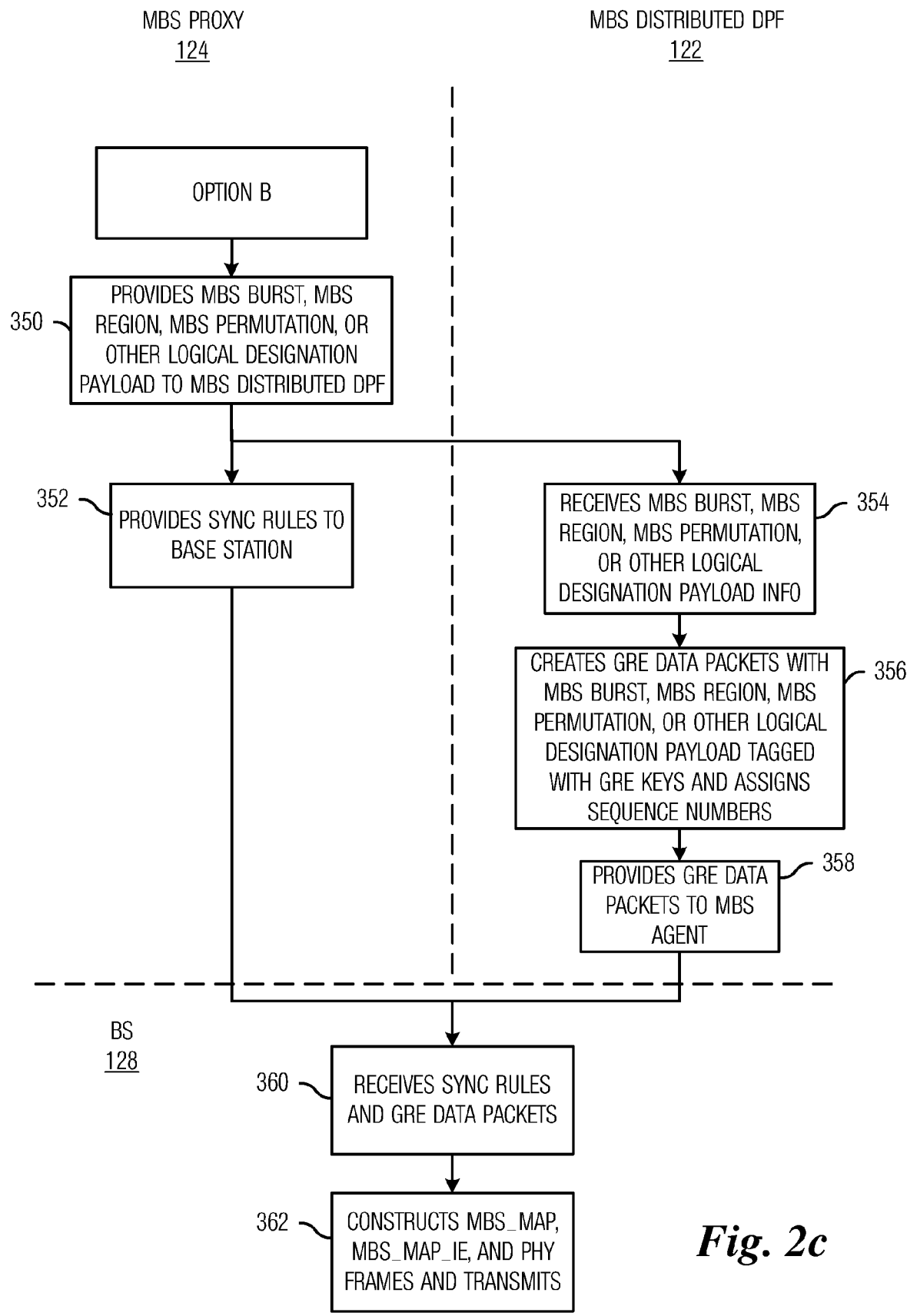

SYNCHRONIZATION AND MACRO DIVERSITY FOR MCBCS

This application claims the priority benefit of commonly owned U.S. Provisional Patent Application having Ser. No. 60/981,096 entitled, "Method and System for Supporting MCBCS Synchronization and Macro Diversity," filed on Oct. 18, 2007, which is hereby incorporated by reference.

TECHNICAL FIELD

This invention relates generally to communications systems and, more particularly, to multicast and broadcast systems.

BACKGROUND

Multicast and Broadcast Service (MCBCS) is an optional feature, which refers to a network's ability to provide flexible and efficient mechanisms of sending common (the same) information content to multiple users using shared radio resources. When available and appropriate, this may use the MBS air interface feature of the IEEE 802.16e standard. The MBS framework may be used to offer real-time streaming applications or non-real time file transfer/download for store and play usage. The type of information transmitted may be any type of data, e.g., text, multimedia (e.g., voice), and streaming media. The MBS may deliver content to MBS user groups, based on local policy and subscription. The multicast groups membership can be static or dynamic; users can join and leave groups at any time. By using multicast broadcast services, it will greatly save resources and by supporting Macro diversity and MS to receive data while in idle mode, it also saves a lot of power at the MS side.

IEEE 802.16e defines that for multi-base station MBS, if a mobile station (MS) is in an idle mode, and moves into base station's (BS) in the same MBS zone, the MS may not have to re-enter the network and to re-establish a connection or a connection defined by MBS contents identifier to monitor the multicast and broadcast service flow. In addition, for the MCBCS services, it is a requirement from the operator to support MS to receive the same contents under idle mode, which gives many benefits including the power saving. In order to ensure that each BS will transmit the exact same content with the exact same order at all BSs, synchronization and macro diversity are needed.

SUMMARY OF THE INVENTION

These and other problems are generally solved or circumvented, and technical advantages are generally achieved, by preferred embodiments of the present invention which provides synchronization and macro diversity for multicast and broadcast services.

In an embodiment, a method for transmitting data is provided. A packet flow is received by a first component, such as a MBS Distributed DPF that then assigns a first identification key, such as a GRE key, to the packet flow if the first component and second component is not collocated. A second component, such as a MBS Proxy, determines the synchronization information and constructs one or more MBS bursts and may group the MBS bursts into a MBS burst group payload, such as a MBS Region, MBS Permutation Zone, or other logical designation. The second component also constructs the MBS_MAP message and the MBS_MAP_IE message. The first component creates data packets including the synchronization information and the MBS burst or burst group payload, wherein the data packets are tagged with a GRE key based on the MBS zone, and assigns a sequence number. The data packets are provided to the base station, and the base station constructs the final PHY frame and transmits over the air.

In another embodiment, another method of transmitting data is provided. A packet flow is received by a first component, such as a MBS Distributed DPF, and a first identification key, such as a GRE key, is assigned to the packet flow if the first component and the second component are not collocated. The synchronization information is determined and one or more MBS bursts are constructed and may grouped into a MBS burst or group payload, such as a MBS Region, MBS Permutation Zone, or other logical designation, by a second component, such as a MBS Proxy. The second component provides the synchronization information to a base station. The second component creates data packets that include the MBS burst or group payload tagged with a second identification key such as GRE key based on the MBS zone with a sequence number. The base station receives the synchronization rules and the MBS burst or group payload, constructs the MBS_MAP and MBS_MAP_IE messages, and builds the final PHY frame and transmits it over the air.

In yet another embodiment, another method of transmitting data is provided. A packet flow is received by a first component, such as a MBS Distributed DPF, and a first identification key (such as GRE key) is assigned. Packets are constructed by the first component with the first identification key and sequence numbers, which packets are then provided directly to a base station. A second component, such as a MBS Proxy, determines the synchronization information and provides it to the base station. The base station constructs one or more MBS bursts and may groups the MBS bursts into a MBS group payload, such as a MBS Region, MBS Permutation Zone, or other logical designation, the MBS_MAP message, and the MBS_MAP_IE messages. The base station then builds the final PHY frame and transmits it over the air.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2a-2c illustrate a method of transmitting synchronized data in accordance with an embodiment of the present invention;

DETAILED DESCRIPTION OF ILLUSTRATIVE EMBODIMENTS

Figure 1:
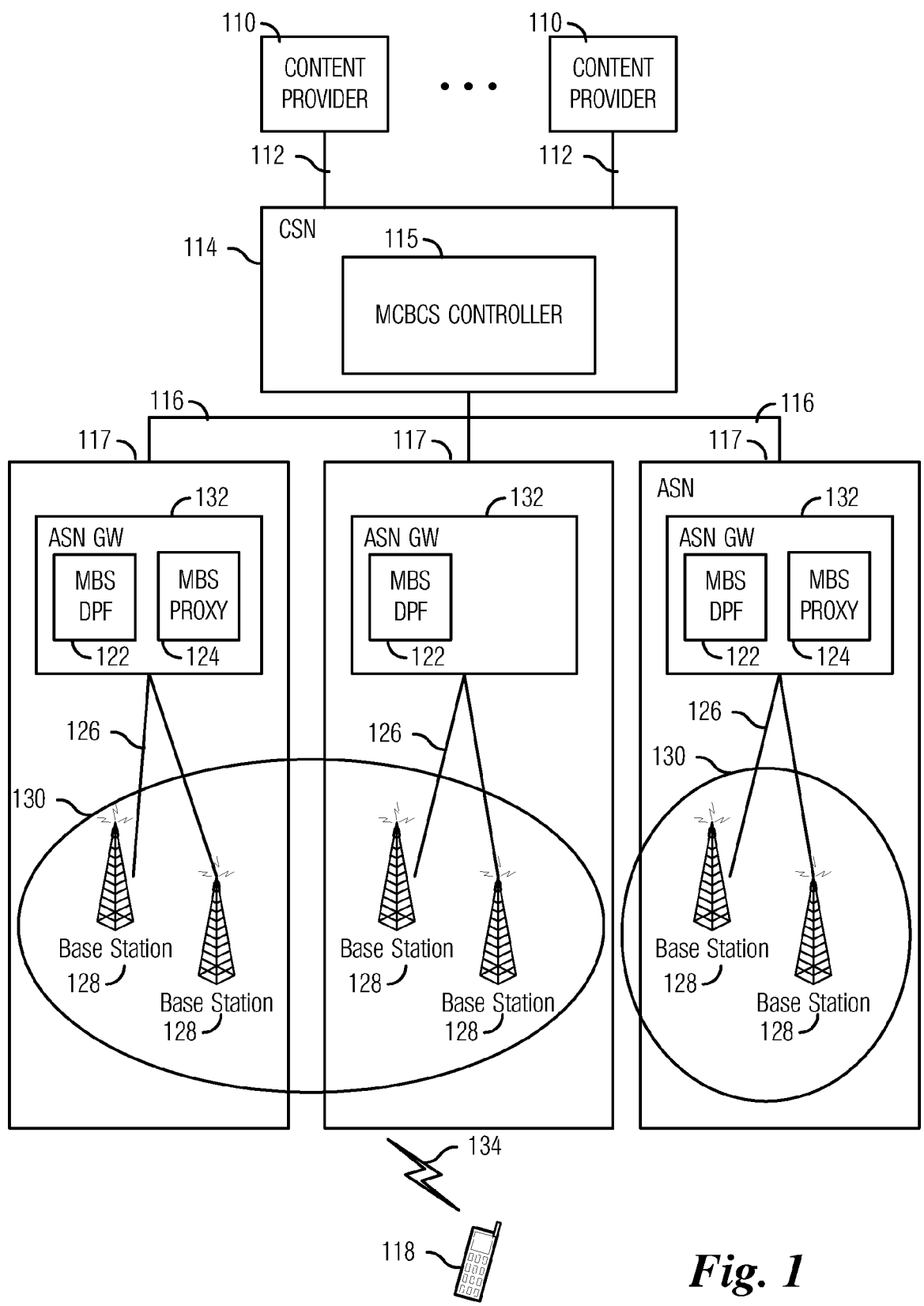
FIG. 1 is a multicast and broadcast system (MBS) network diagram embodying features of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

FIG. 1 is a multicast and broadcast system (MCBCS) network diagram embodying features of the present invention. Content providers 110 provide content media flows 112 to a connectivity services network (CSN) 114. A MCBCS controller 115 within the CSN 114 provides a control function and acts to receive and group the individual content media flows 112 into one or more MBS services 116.

The MBS services 116 are provided to one or more MBS zones (130) and, thus, one or more access services networks (ASNs) 117, which provide network access services to mobile stations 118. In particular, the MBS services 116 are provided to an ASN gateway (ASN GW) 132, which generally provides interconnectivity capabilities and network functions for the mobile users, including providing relay services for IP connectivity, radio resource management, multicast and broadcast control intra-ASN mobility, inter-ASN mobility, paging and location management, authentication and authorization capabilities, accounting, quality of service, and the like. The ASN GW 132 may also assign a service ID, setup the MBS data path, and perform synchronization for the MBS.

In an embodiment, the ASN GW 132 includes an MBS distributed data path function (MBS Distributed DPF) 122 and an MBS proxy 124. Generally, the MBS proxy 124 is a signaling plane entity that allocates, manages, and maintains resources/resource identifiers within each MBS zone, and the MBS DPF 122 is in the data path and establishes and maintains MBS data transport between the CSN 114 and the mobile stations 118. Each MBS zone preferably has a single MBS proxy 124. If the service continuity and/or overlapping zone management is needed, one MBS proxy may manage more than one MBS zone. FIG. 1 shows the case that the MBS proxy only need to manage its own MBS zone.

The ASN GW 132 provides data packets 126 that include the content media flows 112 to base stations 128 within one or more MBS zones 130. As will be discussed in greater detail below, each content media flow 112 may be identified as being sent to one or more specific MBS zones 130. The ASN GW 132 transmits the data packets 126 to an MBS agent within each base station (the base station and the MBS agent are collectively referred by reference numeral 128) within each MBS zone 130 that the content media flow 112 is to be sent via radio frequencies 134.

It should be noted that the network diagram illustrated in FIG. 1 is provided for illustrative purposes only in the context of preferred embodiments of the present invention, and as a result, the network diagram does not show all of the elements that may be present in a multicast and broadcast system. For example, the MBS network may include an authentication, authorization and accounting (AAA) server, location registers, multicast router, and the like. Furthermore, each element may include additional components. For example, the ASN GW may include a handover function, a context function, an AAA client, a radio resource management function, a paging controller, a location register, a key distributor, an upper sync executer, a synchronization controller, and the like, and the CSN may include an AAA function, a Policy Function (PF), a DHCP Server, and the like. Additional information regarding these elements, and other elements in the network, may be found in IEEE 802.16 standard, which is incorporated herein by reference.

Figure 2B:
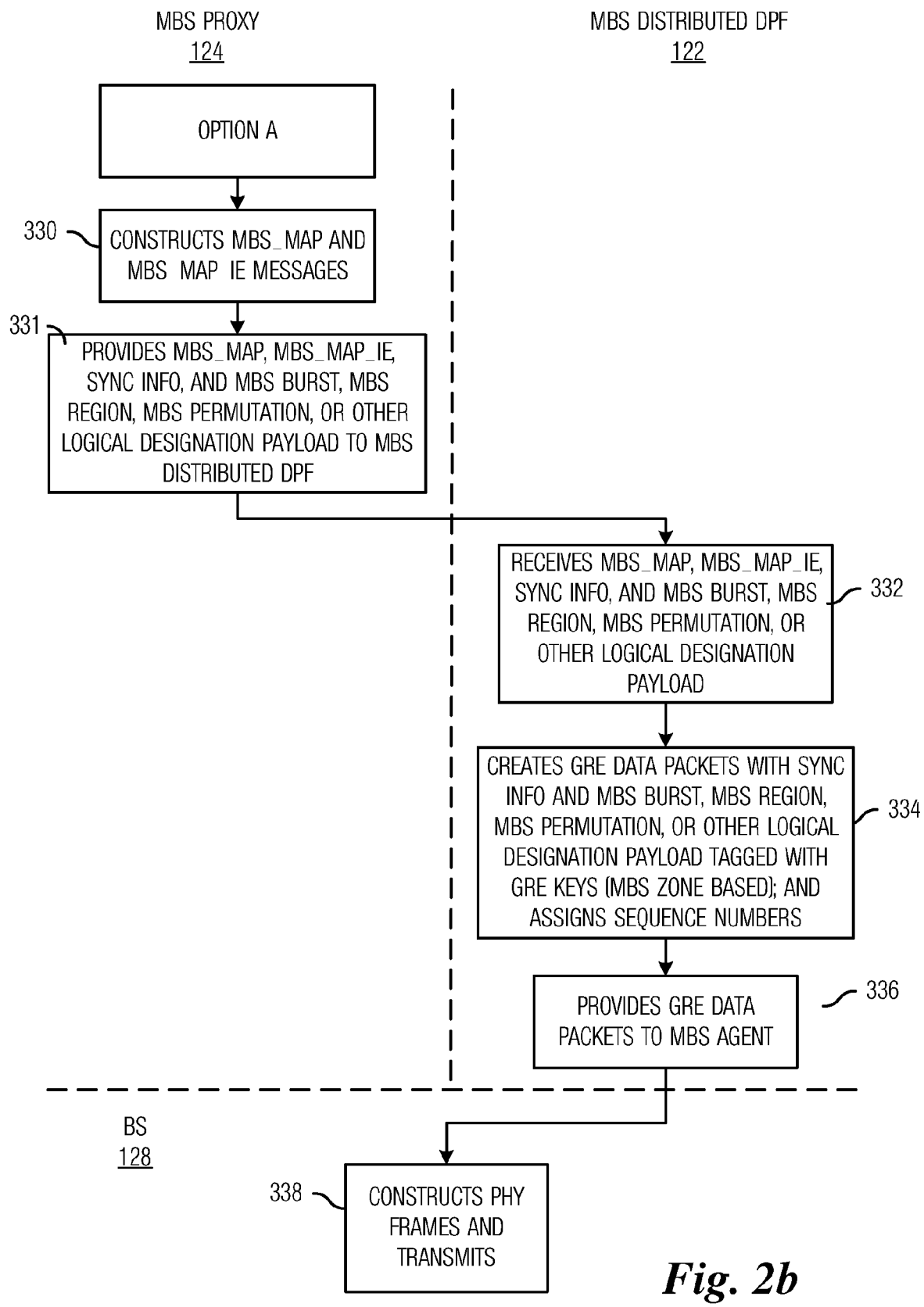

Referring now to FIGS. 2a-2c, a method of supporting synchronization and MBS diversity is provided. The method begins in step 210, wherein, preferably, the MBS Distributed DPF receives a service packet flow. Generally, the one or more MBS content flows are received from one or more content providers, such as content providers 110 illustrated in FIG. 1. The MBS content flows may represent any type of data, including voice, data, video, music, or the like, and may be grouped into an IP multicast group and/or one or more MBS services. Generally, IP multicast groups and/or MBS services may be grouped together if they share common quality of service (QoS) requirements, destination, and the like.

For example, each MBS content flow may represent, for example, an individual news, music, or video station (e.g., ABC, NBC, CBS, CNN, etc.). The MBS content flows of the individual news, music, or video stations may be grouped together as an MBS service, such as a grouping of sports stations, news stations, movie stations, or the like. In this example, the MBS content flows (e.g., the news stations such as CNN, MSNBC, etc.) have the same QoS requirements and may be grouped together as a single MBS service and/or IP multicast group.

Each MBS content flow is assigned a unique content flow identifier, each IP multicast group is assigned a unique IP multicast identifier, and each MBS service is assigned a unique MBS service identifier. In an embodiment, unique IP 5-tuples are used to identify each MBS content flow and IP multicast group, though other identifiers may be used. The MBS service identifier may be any unique string or number, including an IP 5-tuple. If the service only contains one MBS content flow, the MBS service identifier may be the same as the content flow identifier.

In step 212, the MBS Distributed DPF assigns a generic routing encapsulation (GRE) key for identification and creates a GRE packet. The GRE key may be based upon the MBS zone, MBS content flow, IP multicast group, and/or MBS service. In step 214, the MBS Distributed DPF provides the GRE packet flow with the assigned GRE key to the MBS Proxy function (or other function acting as an MBS synchronization controller). Based upon the GRE key, the MBS Proxy determines the provisioned MCBCS service ID, MBS content ID, associated multicast connection ID (MCID), and associated PHY Treatment Policies (e.g., FEC, Modulation, etc.).

It should be noted that the embodiment illustrated in FIG. 2a assumes that the MBS Proxy and the MBS Distributed DPF are not collocated, using GRE packets to communicate. In other embodiments, the MBS Proxy and the MBS Distributed DPF are collocated, in which the MBS Proxy may receive the MCBCS content flow or multicast IP raw packets.

The MBS Proxy creates and generates the synchronization information/rules per GRE key based on the provisioned information and classification rules in step 216. It should be noted that the function of the MBS Proxy that generates the synchronization rules/information is also known as a synchronization controller.

In step 218, the MBS Proxy constructs one or more MBS bursts and may group them into a MBS group payload, such as a MBS Region, MBS Permutation Zone, or other logical designation, comprising one or more MBS medium access control layer protocol data units (MAC PDU). The function of the MBS Proxy that performs this function may be referred to as an upper executer. Thereafter, the processing may proceed along an Option A, which is illustrated in FIG. 2b, or an Option B, which is illustrated in FIG. 2c.

Turning first to FIG. 2b, in step 330, the MBS Proxy constructs the MBS_MAP and MBS_MAP_IE messages. Thereafter, in steps 331 and 332, the MBS Proxy provides the MBS burst or group payload, the MBS_MAP message, the MBS_MAP_IE message, and the synchronization information to the MBS Distributed DPF. In step 334, the MBS Distributed DPF creates GRE data packets containing the MBS region or burst data, MBS_MAP, MBS_MAP_IE, and synchronization rules, tagged with GRE keys based on the MBS zone and assign the sequence number. The GRE data packets are provided to the base station in step 336, and in step 338, the base station constructs the PHY-level frames for transmission to the mobile stations. The function in the base station that constructs the frames for transmission may be referred to as a lower synchronization executer.

Turning now to FIG. 2c, in step 350, the MBS Proxy provides the MBS burst or group payload to the MBS Distributed DPF, and in step 352, the MBS Proxy provides the synchronization information/rules directly to the base station 128, preferably via the control plane. After receiving the MBS burst or group payload in step 354, the MBS Distributed DPF at step 356 creates the GRE data packets tagged with the GRE keys based on the MBS zone and the assigned sequence numbers. These GRE data packets are provided to the base station in step 358.

In step 360, the base station 128 receives the GRE data packets from the MBS Distributed DPF as well as the synchronization information/rules from the MBS Proxy. The base station constructs the MBS_MAP, MBS_MAP_IE, and the final PHY frames for transmission in step 362.

The MBS Proxy/MBS sync controller can send the synchronization rule though the signaling plane to the base station as shown in steps 352 and 360, and when the base station receives the synchronization information/rules from MBS Proxy or MBS Sync Controller, and it also receives the MBS burst or group payload from the anchor MBS DPF or MBS Distributed DPF as shown in steps 358 and 360, then it constructs the MBS_MAP and MBS_MAP_IE messages, and does the final PHY construction and puts it into a subframe and transmits the data over the air.

One of ordinary skill in the art will appreciate that one of the differences between Option A (FIG. 2b) and Option B (FIG. 2c) is the distribution of the work. For example, in Option A, the MBS Proxy constructs one or more MBS bursts and may group them into a MBS group payload, such as a MBS Region, MBS Permutation Zone, or other logical designation payload. The MBS Proxy also constructs the MBS_MAP message and the MBS_MAP_IE message, providing this information with the synchronization rules to the MBS Distributed DPF. The MBS Distributed DPF delivers this information to the base station, which then constructs the PHY frames for transmission.

In Option B, however, the MBS Proxy constructs the MBS burst or group payload and provides it to the MBS Distributed DPF. The base station receives data packets containing the MBS burst or group payload from the MBS Distributed DPF and receives the synchronization rules directly from the MBS Proxy over the signaling plane. The base station itself constructs the MBS_MAP message, the MBS_MAP_IE message, and the PHY-level frames.

Figure 3:
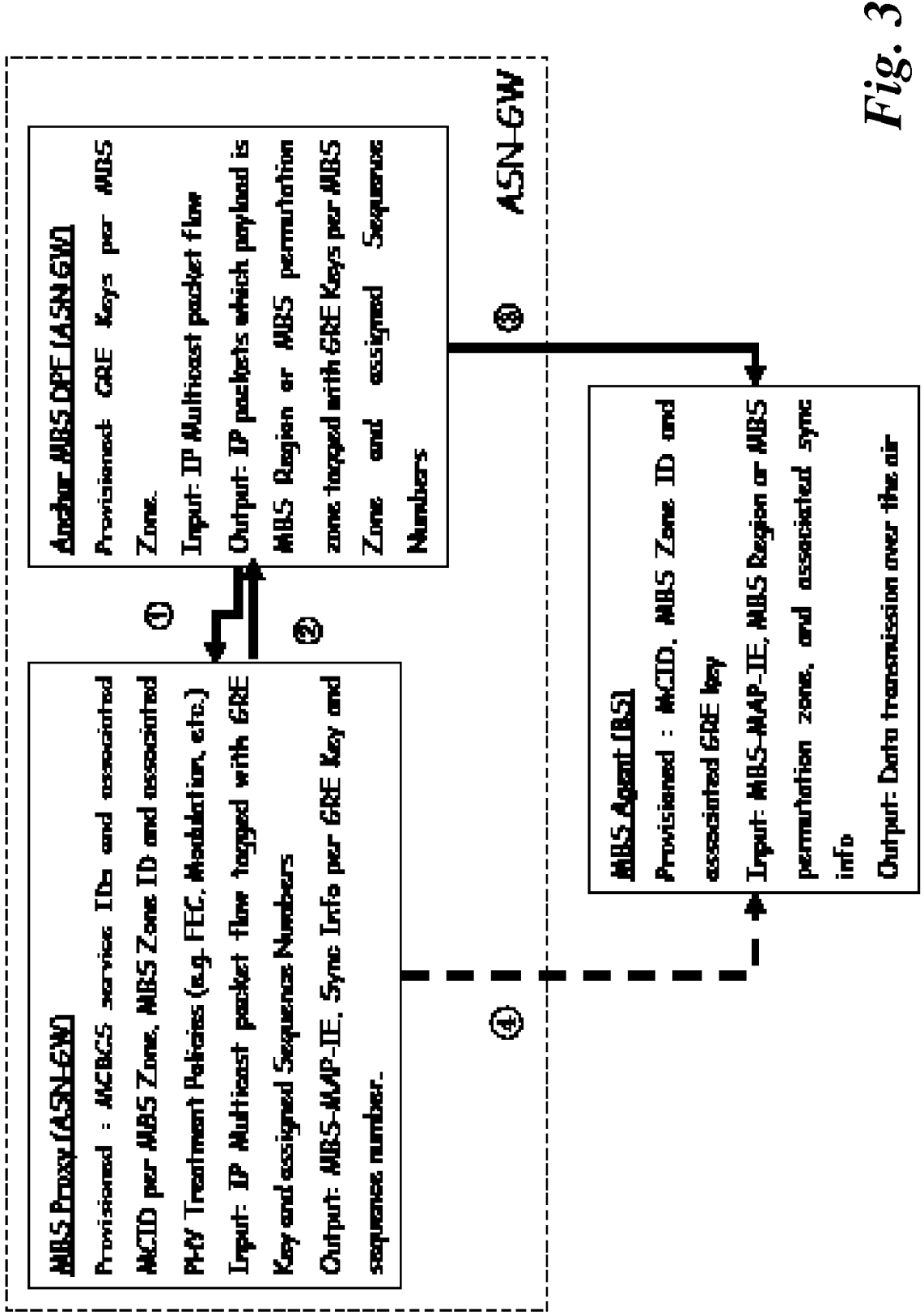
FIG. 3 is diagram illustrating the method of FIGS. 2a and 2c for transmitting synchronized data in accordance with an embodiment of the present invention.

Option B (FIGS. 2a and 2c) is further illustrated in FIG. 3.

Figure 4:
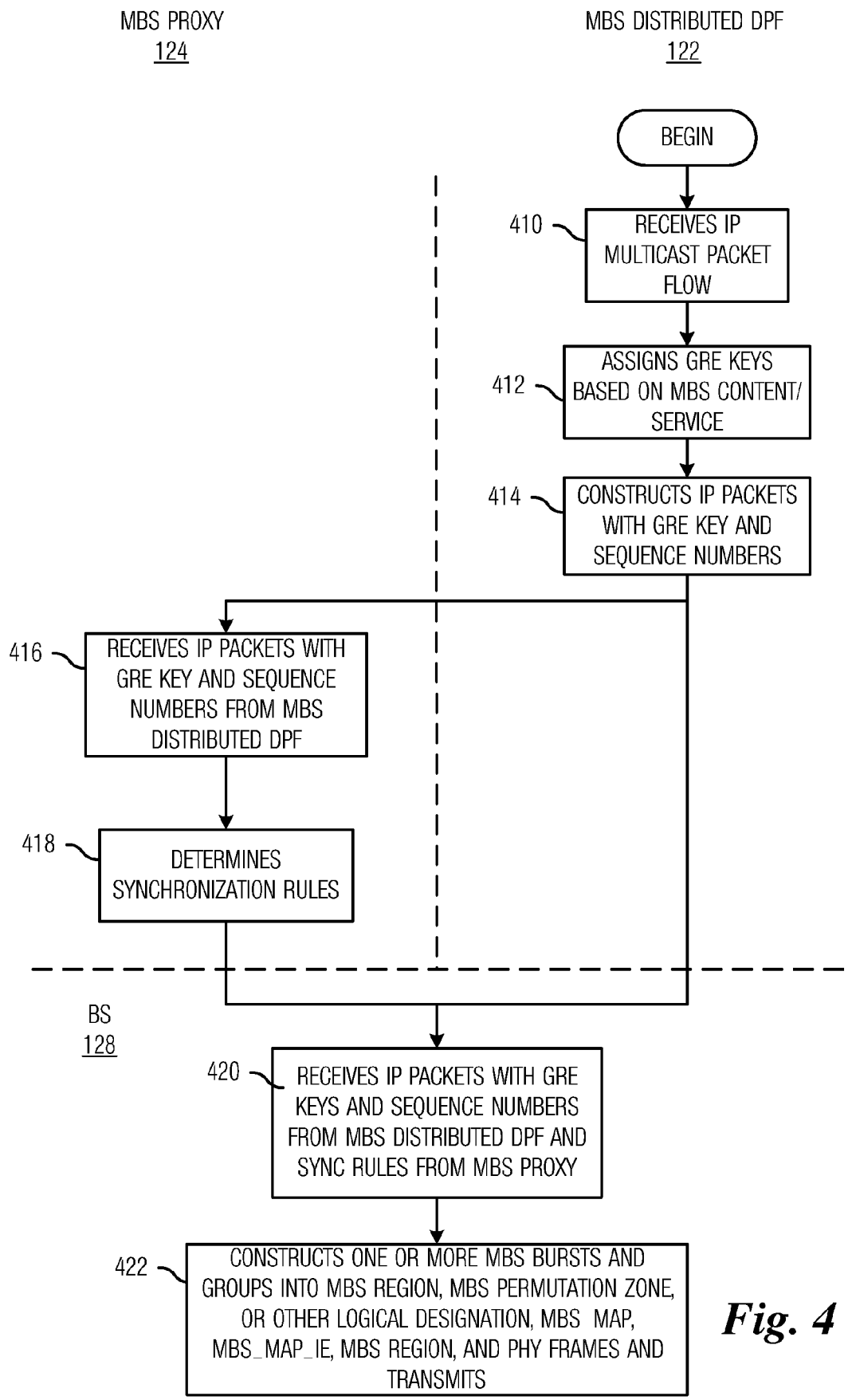
FIG. 4 illustrates another method of transmitting synchronized data in accordance with an embodiment of the present invention.

FIG. 4 illustrates another method of supporting synchronization and MBS diversity. The method begins in step 410, wherein the MBS Distributed DPF receives a service flow comprising an IP multicast packet flow. The service packet flow may comprise one or more MBS content flows, one or more IP multicast groups, and/or one or more MBS services received from a content provider, such as content providers 110 illustrated in FIG. 1. In step 412, the MBS Distributed DPF assigns a GRE key based upon the MBS content/service flow for identification. The GRE key may be based upon the provisioned information, such as MBS content ID, multicast IP address, associated classifiers rules, and the like.

In step 414, the MBS Distributed DPF constructs IP packets tagged with the GRE keys based on the MBS content/service and the assigned sequence numbers. The MBS Distributed DPF provides the IP packet flow with the assigned GRE key with sequence number to both the MBS Proxy function and the base station. In step 416, the MBS Proxy receives the IP packets from the MBS Distributed DPF, and in step 418, the MBS Proxy generates the synchronization information/rules per GRE key based on the provisioned information and classification rules.

The base station, in step 420, receives the IP packets from the MBS Distributed DPF and the synchronization information/rules from the MBS Proxy. The MBS Proxy also provides the base station the multicast connection identifier (MCID) and logical channel ID (LCID) associated with the GRE key. The base station then constructs the MBS_MAP message, the MBS_MAP_IE message, and one or more MBS bursts. The MBS bursts may be grouped into a MBS group payload, such as a MBS Region, MBS Permutation Zone, or other logical designation payload. The PHY-level frames are constructed and transmitted.

Figure 5:
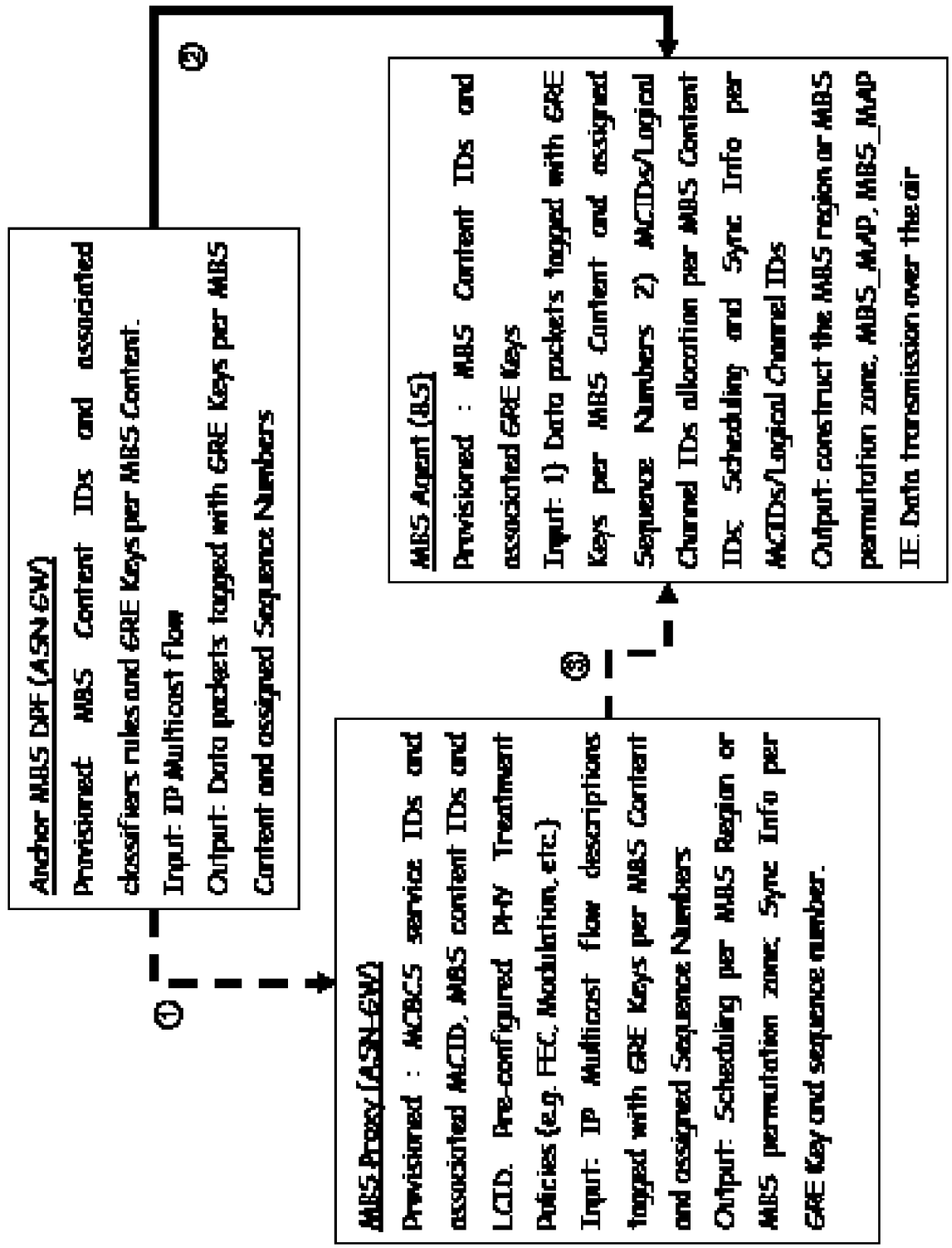
FIG. 5 is a diagram illustrating the method of FIG. 4 for transmitting synchronized data in accordance with an embodiment of the present invention.

The method illustrated in FIG. 4 is further illustrated in FIG. 5.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting data, the method comprising:
receiving a packet flow by a Multicast and Broadcast Service (MBS) Distributed Data Path Function (DPF), wherein the MBS distributed DPF is located at an Access Service Network Gateway (ASN GW);
assigning a generic routing encapsulation (GRE) key to the packet flow by the MBS Distributed DPF;
determining synchronization information based on the GRE key by an MBS proxy, wherein the MBS proxy is collocated with the MBS distribution DPF at the ASN GW;
constructing multiple MBS bursts for a single frame by the MBS Proxy;
constructing Multicast and Broadcast Service Map (MBS_MAP) and Multicast and Broadcast Service Map Information Element (MBS_MAP_IE) messages by the MBS Proxy;
creating, by the MBS Distributed DPF, a GRE packet including the multiple MBS bursts and the synchronization information, wherein the GRE packet is tagged with both the GRE key and one of a plurality of assigned sequence numbers; and
providing the GRE packet to one or more base stations.

2. The method of claim 1, wherein the multiple MBS bursts are a MBS region or MBS permutation zone.

3. The method of claim 1 further comprising constructing by the one or more base stations a physical layer frame based on the GRE packet.

4. The method of claim 1, wherein the packet flow is an internet protocol (IP) multicast packet flow or a multicast and broadcast packet flow.

5. The method of claim 1, wherein the assignment of the GRE key is based on an MBS zone.

6. The method of claim 1, wherein the MBS proxy is a signaling plane entity.

7. The method of claim 6, wherein MBS distributed DPF is a data plane entity, and wherein the MBS distributed DPF and the MBS proxy are separate components within the ASN GW.

8. The method of claim 1, wherein the MBS proxy receives the GRE key from the MBS distributed DPF before the MBS proxy determines the synchronization information.

9. A method for transmitting data, the method comprising:
receiving a packet flow by a Multicast and Broadcast Service (MBS) Distributed Data Path Function (DPF), wherein the MBS distributed DPF is positioned at an Access Service Network Gateway (ASN GW);
assigning a generic routing encapsulation (GRE) key to the packet flow by the MBS Distributed DPF;
determining synchronization information based on the GRE key by an MBS proxy, wherein the MBS proxy is co-positioned with the MBS distribution DPF at the ASN GW;
constructing multiple MBS bursts for a single frame by the MBS Proxy;
providing the synchronization information to one or more base stations by the MBS proxy;
creating, by the MBS Distributed DPF, a GRE packet including the multiple MBS bursts, wherein the GRE packet is tagged with both the GRE key and one of a plurality of assigned sequence numbers;
providing the GRE packet to one or more base stations; and
constructing Multicast and Broadcast Service Map (MBS_MAP) and Multicast and Broadcast Service Map Information Element (MBS_MAP_IE) messages by the one or more base stations.

10. The method of claim 9, wherein the multiple MBS bursts is a MBS region or a MBS permutation zone.

11. The method of claim 9, wherein the packet flow is an Internet Protocol (IP) multicast packet flow or a multicast and broadcast packet flow.

12. The method of claim 9, wherein the MBS proxy is a signaling plane entity.

13. The method of claim 12, wherein MBS distributed DPF is a data plane entity, and wherein the MBS distributed DPF and the MBS proxy are separate components within the ASN GW.

14. The method of claim 9, wherein the MBS proxy receives the GRE key from the MBS distributed DPF before the MBS proxy determines the synchronization information.

15. The method of claim 12, wherein the MBS proxy provides the synchronization information directly to the one or more base stations by forwarding the synchronization information over a control plane.

16. A method for multicast transport, the method comprising:
receiving a packet flow by a Multicast and Broadcast Service (MBS) distribution data path function (DPF), wherein the MBS distributed DPF is located at an Access Service Network Gateway (ASN GW);
assigning a generic routing encapsulation (GRE) key to the packet flow by the MBS distribution DPF;
constructing a GRE packet by the MBS distribution DPF, wherein the GRE packet comprises the GRE key assigned to the packet flow and a unique one of a plurality of sequence numbers that identifies the GRE packet;
sending, the GRE packet to one or more base stations by the MBS distribution DPF;
determining synchronization information based on the GRE key by an MBS Proxy, wherein the MBS proxy is collocated with the MBS distribution DPF at the ASN GW;
providing the synchronization information to one or more base stations;
constructing one or more MBS bursts by the one or more base stations based on the GRE packet received from the MBS distribution DPF;
constructing Multicast and Broadcast Service Map (MBS_MAP) and Multicast and Broadcast Service Map Information Element (MBS_MAP_IE) messages by the one or more base stations; and
constructing a frame based on the MBS bursts and the synchronization information by the one or more base stations.

17. The method of claim 16, wherein the GRE packets are Internet Protocol (IP) packets.

18. The method of claim 16, wherein the MBS proxy is a signaling plane entity.

19. The method of claim 18, wherein MBS distributed DPF is a data plane entity, and wherein the MBS distributed DPF and the MBS proxy are separate components within the ASN GW.

20. The method of claim 16, wherein the MBS proxy provides the synchronization information directly to the one or more base stations by forwarding the synchronization information over a control plane.

* * * * *